United States Patent
Jin et al.

(10) Patent No.: US 9,110,990 B2
(45) Date of Patent: Aug. 18, 2015

(54) APPARATUSES, METHODS AND SYSTEMS FOR IMPROVING THE RELEVANCY OF INTERACTIVE PROGRAM GUIDE SEARCH RESULTS ON A WIRELESS USER'S HANDSET AND TELEVISION

(75) Inventors: Zhiying Jin, Lexington, MA (US); Wenjie Liu, Waltham, MA (US); Juhong Liu, Sudbury, MA (US); Jimena Velarde, Arlington, MA (US); Haosheng Guo, Nashua, NH (US); Angel Cordero, Chatham, NJ (US); Martin Busse, Woburn, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 238 days.

(21) Appl. No.: 12/418,158

(22) Filed: Apr. 3, 2009

(65) Prior Publication Data
US 2010/0257165 A1   Oct. 7, 2010

(51) Int. Cl.
*G06F 17/30*   (2006.01)
*H04N 21/414*   (2011.01)
*H04N 21/482*   (2011.01)

(52) U.S. Cl.
CPC ...... *G06F 17/30864* (2013.01); *G06F 17/3082* (2013.01); *H04N 21/41407* (2013.01); *H04N 21/4828* (2013.01)

(58) Field of Classification Search
CPC .................................................... G06F 17/3082
USPC .......................................... 707/999.005, 748
See application file for complete search history.

(56) References Cited

U.S. PATENT DOCUMENTS

| | | | |
|---|---|---|---|
| 7,870,117 B1 * | 1/2011 | Rennison | 707/706 |
| 2002/0198875 A1 * | 12/2002 | Masters | 707/4 |
| 2004/0141354 A1 * | 7/2004 | Carnahan | 365/145 |
| 2006/0064411 A1 * | 3/2006 | Gross et al. | 707/3 |
| 2006/0184625 A1 * | 8/2006 | Nordvik et al. | 709/204 |
| 2010/0082629 A1 * | 4/2010 | Davis et al. | 707/741 |

* cited by examiner

*Primary Examiner* — Alexey Shmatov

(57) ABSTRACT

This disclosure details the implementation of apparatuses, methods and systems for improving the relevancy of Interactive Program Guide search results on a wireless user's handset and television (hereinafter, "IPG"). The IPG implements a search facility whereby users may enter search criteria into a wireless user's handset or television or the like and receive search results sorted to provide the most relevant results first. In one embodiment, the IPG may receive search criteria into a search engine and determine one or more search results in response to the search criteria. The IPG may query one or more databases of attributes, compare the search results to the attributes, and calculate weights for each of the search results according to one or more attributes. The IPG may also sort and return the compared search results so that the results are returned in order of relevance according to the weighting.

32 Claims, 10 Drawing Sheets

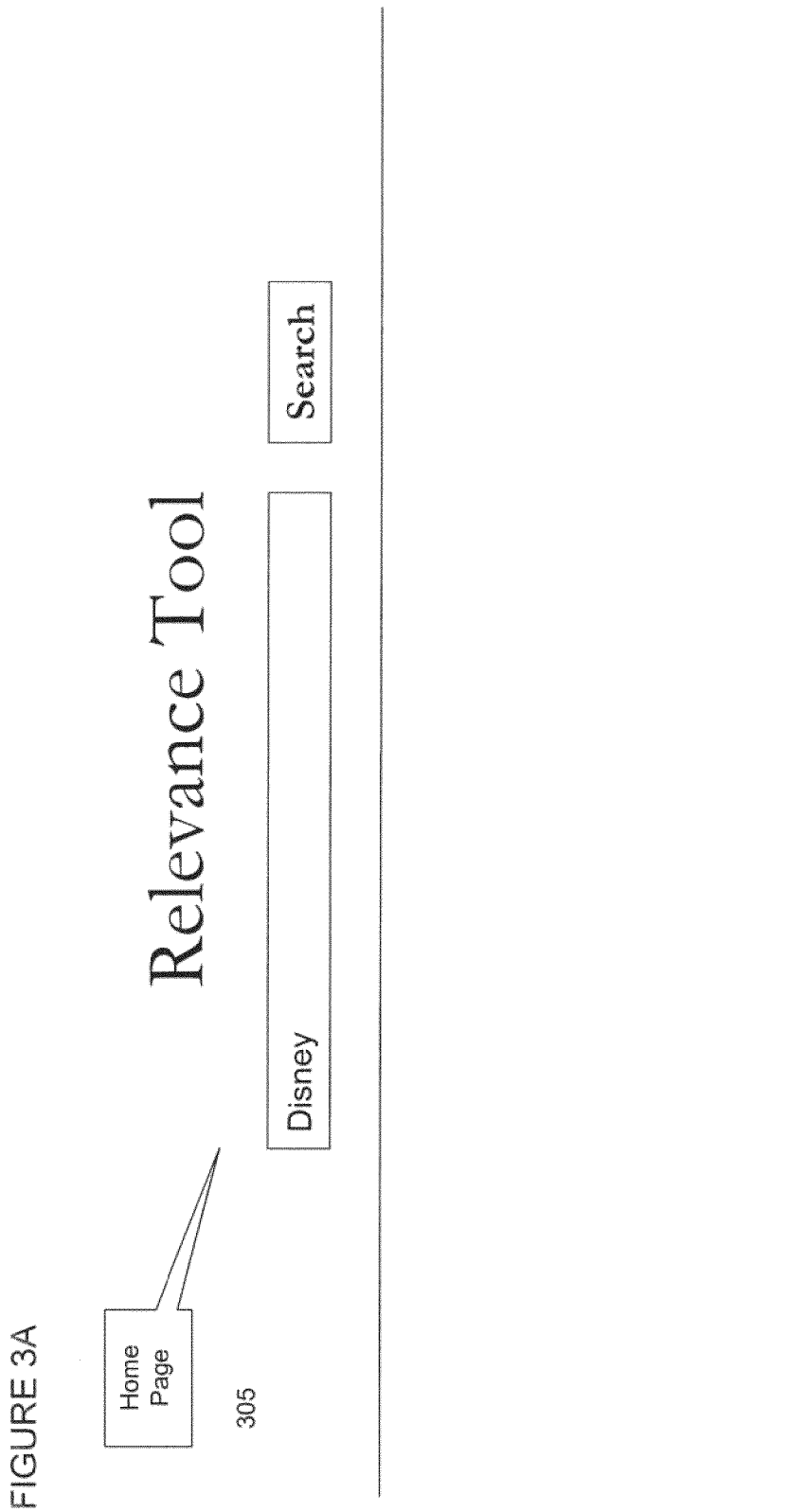

FIGURE 3B

Relevance Tool

Disney | Search

Filtering option
- ● All
- ○ VOD
- ○ Games
- ○ Linear
- ○ Cast/Crew
- ○ Channel Name

310

-10/130 (P 1/13) < >   Total Hits: 1583

| Title | Type | Channel/Station | Air Time | Relevance | Edit | Reset | Start | End |
|---|---|---|---|---|---|---|---|---|
| Disney's Kim Possible | Program Group | | | BB | Edit | | | 320 |
| Disney's The Legend of Tarzan | Program Group | | | | | | | |
| Disney's American Dragon: Jake Long | Program Group | | | | | | | |
| Disney's Lilo & Stitch: The Series | Program Group | | 315 | | | | | |
| Disney's Brandy & Mr. Whiskers | Program Group | | | | | | | |
| Melissa Disney | Actor | | | | | | | |
| Disney's Kim Possible Movie: So the Drama | Movie & Actors | | | | | | | |
| Disney Jewelry | SH05764500000 | QVC | 20080225 1400 | XX | Edit | Reset | 325 | |
| Disney's The Buzz on Maggie | Program Group | | | 330 | | | | |
| Disney's Dave the Barbarian | Program Group | | | | | | | |

Clicking on Program Group, user has the option to view the episodes of that series and select one of them to change/edit relevance Current predetermined relevance of the Program Group/Series Reset option will appear only on those assets where relevance has been changed. Pressing Reset will return predetermined relevance values to the asset.

Edit option gives the possibility to change or delete changes in relevance

Enter New Relevance and select a Start and Ending period

Click here to go back home

FIGURE 3D

Relevance Tool

Disney                Search

- ● All
- ○ VOD
- ○ Games
- ○ Linear
- ○ Cast/Crew
- ○ Channel Name

| Title | Type | Channel/Station | Air Time | Relevance | Edit | Reset | Start | End |
|---|---|---|---|---|---|---|---|---|
| Disney's Kim Possible | EP4797325 39399 | The Disney Channel | 20080220 1830 | BB | Edit | | | |
| Disney's Kim Possible | EP4797321 01615 | Toon Disney | 20080220 1900 | BB | Edit | | | |
| Disney's Kim Possible | EP4797321 22755 | Toon Disney | 20080220 1930 | BB | Edit | | | |
| Disney's Kim Possible | EP4797321 01618 | Toon Disney | 20080220 2000 | BB | Edit | | | |
| Disney's Kim Possible | EP4797323 57559 | Toon Disney | 20080220 2030 | BB | Edit | | | |
| Disney's Kim Possible | EP4797323 75897 | The Disney Channel | 20080221 1830 | BB | Edit | | | |
| Disney's Kim Possible | EP4797323 57557 | The Disney Channel | 20080222 1830 | BB | Edit | | | |
| Disney's Kim Possible | EP4797323 57558 | The Disney Channel | 20080224 0530 | BB | Edit | | | |
| Disney's Kim Possible | EP4797323 71003 | The Disney Channel | 20080225 0530 | BB | Edit | | | |
| Disney's Kim Possible | EP4797323 83203 | The Disney Channel | 20080226 1830 | BB | Edit | | | |

FIGURE 3E

Relevance Tool

Disney  [Search]

○ All
● VOD
　○ All
　○ Action
　○ Drama
　○ Movie
　○ Information
　○ Music
　○ Interests
　○ Sports
　○ International
　○ Children
　○ Science Fiction
　○ Family
　○ Shows
　○ Comedy
○ Games
○ Linear
○ Cast/Crew
○ Channel Name -10/130 (P 1/13) < >  Total Hits: 1583

| Title | Type | Channel/Station | Air Time | Relevance | Edit | Reset | Start | End |
|---|---|---|---|---|---|---|---|---|
| Disney's The Kid | Movie & Actors | | | ZZ | | | | |
| US Destinations: FL: Orlando | OD3521209867 | | | WW | | | | |
| 101 Dalmatians | Movie & Actors | | | XX | | | | |
| Alice In Wonderland | Movie & Actors | | | YY | | | | |

Drill down menu

Relevance Tool

Shrek | Search

| Title | Type | Channel/Station | Air Time | Relevance | Edit | Reset | Start | End |
|---|---|---|---|---|---|---|---|---|
| Shrek Pick A Pair | OD2815581788 | | | AA | | | | |
| Shrek Princess Club | OD3541869073 | | | CC | | | | |

−10/130 (P 1/1) < > Total Hits: 2

○ All
○ VOD
● Games
  ○ All
  ○ Action
  ○ Adventure
  ○ Card & Board
  ● Children
  ○ Education
  ○ Puzzle
  ○ Sports
  ○ Trivia
○ Linear
○ Cast/Crew
○ Channel Name Drill down menu

335

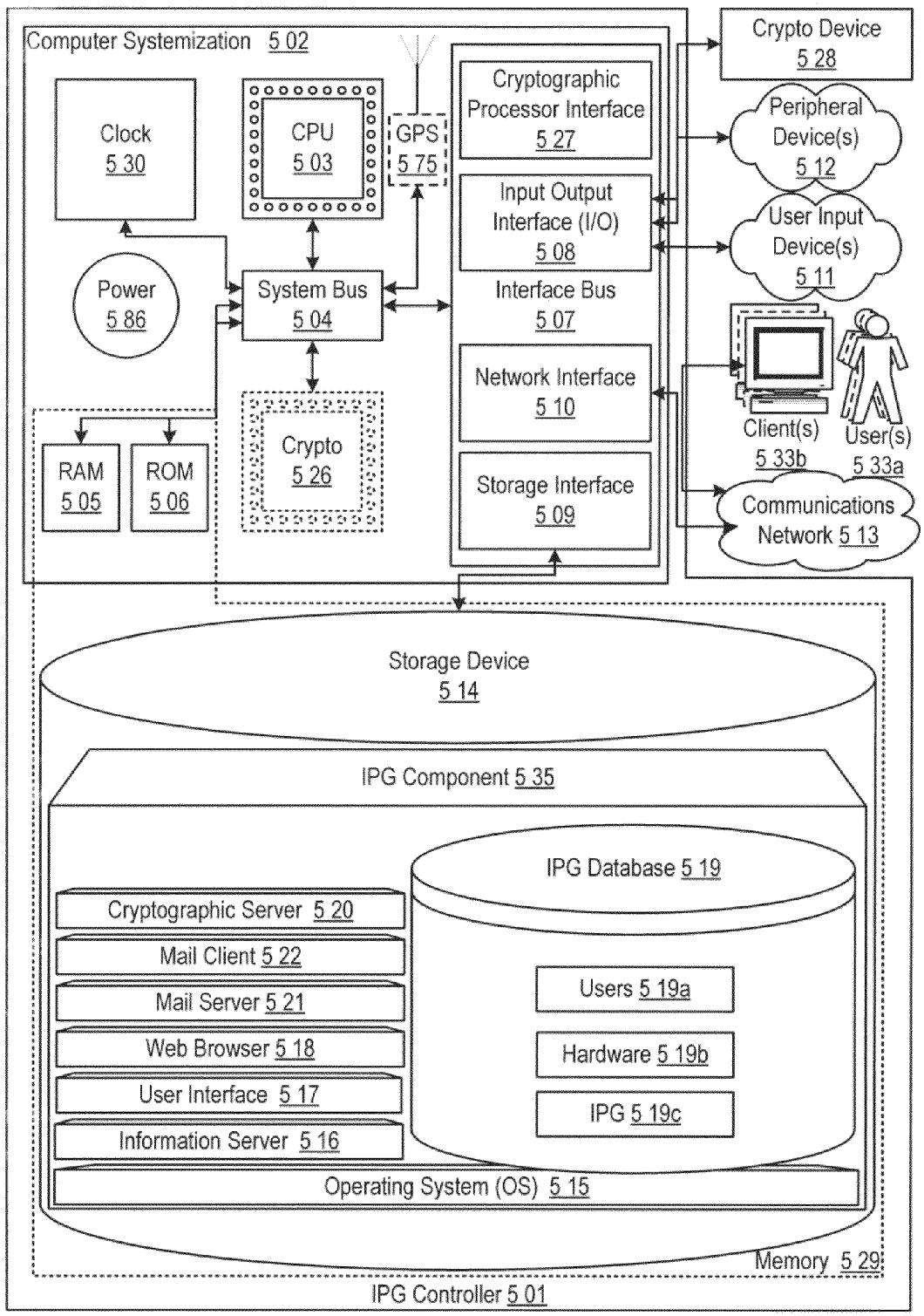

APPARATUSES, METHODS AND SYSTEMS FOR IMPROVING THE RELEVANCY OF INTERACTIVE PROGRAM GUIDE SEARCH RESULTS ON A WIRELESS USER'S HANDSET AND TELEVISION

BACKGROUND

Web search engines like GOOGLE exist. Mobile devices like the IPHONE allow users to search through GOOGLE.

BRIEF DESCRIPTION OF THE DRAWINGS

FIGS. 3A-3F show implementations of a user interface through screenshots;

FIG. 5 is of a block diagram illustrating exemplary embodiments of a Manager controller.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION OF PREFERRED EMBODIMENTS

This disclosure details the implementation of apparatuses, methods and systems for improving the relevancy of Interactive Program Guide (hereinafter, "IPG") search results on a wireless user's handset and television. The IPG implements a search facility whereby users may enter search criteria into a wireless user's handset or television or the like and receive search results sorted to provide the most relevant results first. In one embodiment, a method is disclosed, comprising: receiving search criteria into a search engine; determining one or more search results in response to the search criteria; querying one or more databases of attributes; comparing the search results to the attributes; calculating weights for each of the search results according to one or more attributes; sorting the search results so the results are returned in order of relevance according to the weighting; and returning the results.

It is to be understood that, depending on the particular needs and/or characteristics of an IPG user, attributes, administrator, data files, servers, data payload, monetization model, hardware configuration, network framework, and/or the like, various embodiments of the IPG may be implemented that enable a great deal of flexibility and customization. The instant disclosure discusses embodiments of the IPG primarily within the context of cable television based searches through set-top boxes. However, it is to be understood that the IPG described herein may be readily configured/customized for a wide range of other applications or implementations. For example, aspects of the IPG may be adapted for wireless user handsets, portable mobile devices, computer-based searches, and/or the like applications. It is to be understood that the IPG may be further adapted to other implementations and/or applications that return search results.

Figure 1:
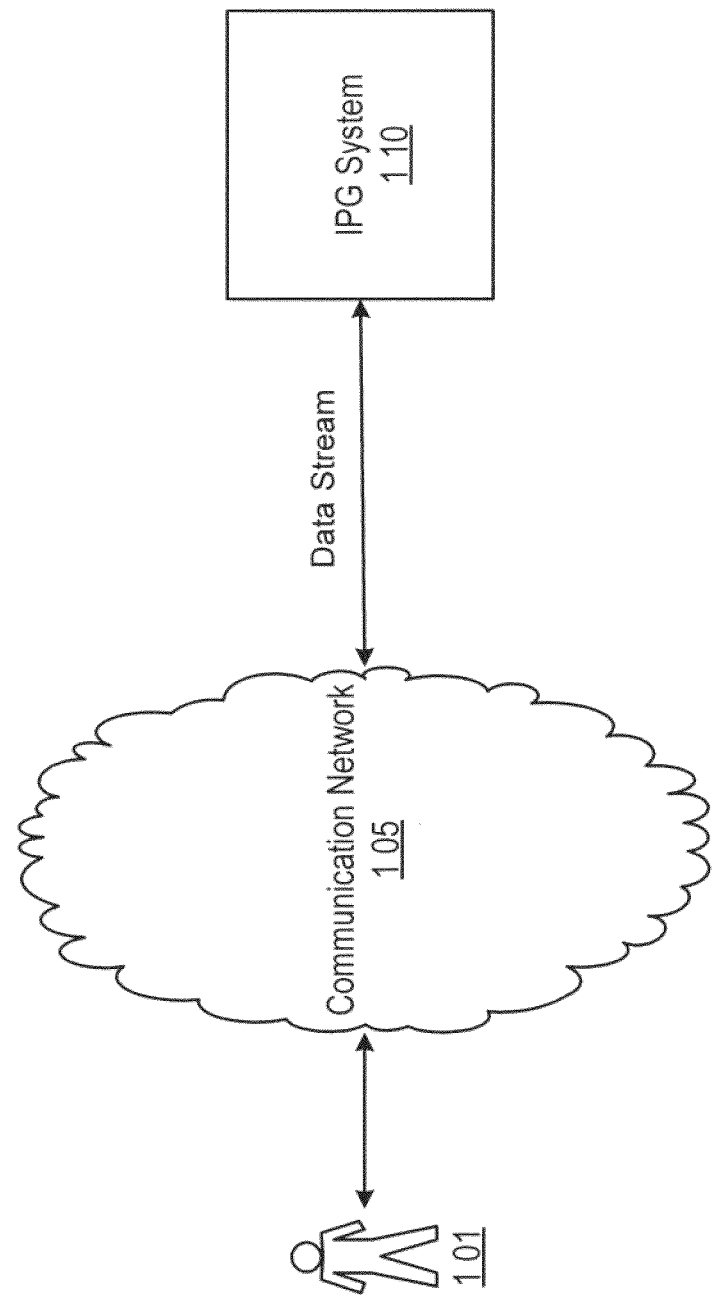
FIG. 1 provides an overview of an implementation of data flow between an IPG and affiliated entities in one embodiment of IPG operation.

FIG. 1 provides an overview of an implementation of data flow between an IPG and affiliated entities in one embodiment of IPG operation. In FIG. 1, a user 101 is shown initiating a search that is transmitted via a communications network 105 to an IPG 110. The user may employ a wide variety of different communications devices within embodiments of IPG operation. For example, in one embodiment, devices such as an internet protocol (IP) enabled telephone, Verizon Fiber Optic Service (FiOS) television, a personal computer (PC), other IP-enabled communications devices, and/or the like may be employed. In another embodiment of the IPG, mobile phones may be employed by users and engaged by IPG facilities and/or services.

Figure 2:
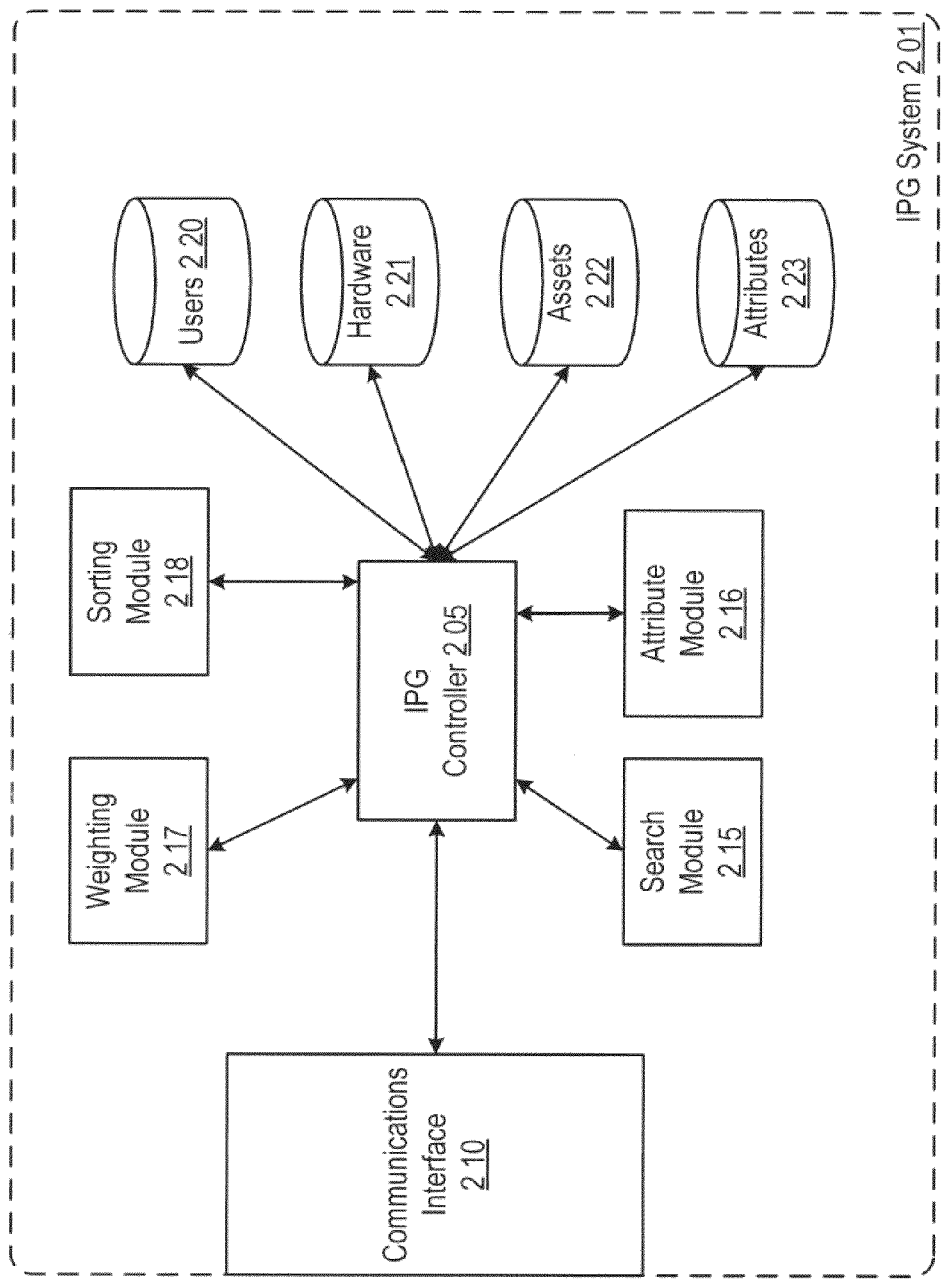
FIG. 2 shows an implementation of IPG components in one embodiment of IPG operation.

FIG. 2 shows an implementation of IPG components in one embodiment of IPG operation. The IPG system 201 may contain a number of modules and/or data stores. An IPG controller 205 may serve a central role in some embodiments of IPG operation, serving to orchestrate the reception, generation, and distribution of data and/or instructions, to, from, and between IPG modules and/or mediate communications with external entities and systems.

In one embodiment, the IPG controller 205 may be housed separately from other modules and/or databases within the IPG, while in another embodiment, some or all of the other modules and/or databases may be housed within and/or configured as part of the IPG controller. Further detail regarding implementations of IPG controller operation, modules, and databases is provided below.

In the implementation illustrated in FIG. 2, the IPG controller 205 may be configured to couple to external entities via a communications interface 210. The communications interface may, for example, configure data received from the IPG controller 205 and/or any of a variety of external entities for receipt and/or transmission to other entities and/or IPG components. In various implementations, a communications interface 210 may, for example, serve to configure data into application, transport, network, data link, and/or physical layer formats in accordance with a TCP/IP communications model. The communications interface 210 may further be configurable to implement and/or translate SIP, SIP CPE, VOIP, and/or the like data formats and/or protocols. The communications interface 210 may further house one or more ports, jacks, antennas, and/or the like to facilitate wired and/or wireless communications with and/or within the IPG.

In one implementation, the IPG controller 205 may further be coupled to a plurality of modules configured to implement IPG facilities and/or services. A search module 215 may, in one implementation, be configurable to receive and/or process a search request. For example it may perform a search query and return results of the search. The search module 215 may, in one implementation, be further configurable to map search terms. Synonyms of search terms can be mapped to the search terms that were entered, for example. In one implementation, entries that return few or no results can be culled and synonyms for the entered terms can be used to generate additional results. Additional search terms can also be obtained from tracking successive user entries that are entered after a failed search attempt. The additional terms entered after failed search requests can be tied to the original term in a mapping file. Where users enter the same failed search term, but their successive attempts to achieve results are different, additional mappings can include all the successive attempts or the results that are common to each subsequent attempt by the various users. In one implementation, the search module and/or one or more other IPG components may comprise components of a search engine.

Mapping may also include genre mapping. In one implementation, all genres can be mapped to a subset of genres in a hierarchy so similar genres will return the same results. For example, where the genre "children" is searched or the genre "kids" is searched, the results will be mapped to the same genre so that the results of either search will return the appropriate results. For example, a file can be retrieved from the attribute database 223. An example XML hierarchy map for genres may take the following form:

```
<Genre_Mapping>
    <Genre_ID>
        <Name> Entertainment </>
        <ID> 11111 </ID>
        <Parent_ID> NULL </Parent_ID>
        <Weight> +1 </Weight>
        <Advertiser_ID> 1234 </Advertiser_ID>
        <Advertiser_Weight> +2 </Advertiser_Weight>
    </Genre_ID>
    <Genre_ID>
        <Name> Children's Programming </>
        <ID> 22222 </ID>
        <Parent_ID> 11111 </Parent_ID>
        <Weight> +2 </Weight>
        <Advertiser_ID> 2223 </Advertiser_ID>
        <Advertiser_Weight> +1 </Advertiser_Weight>
    </Genre_ID>
    <Genre_ID>
        <Name> Kids </>
        <ID> 33333 </ID>
        <Parent_ID> 22222 </Parent_ID>
        <Weight> +3 </Weight>
        <Advertiser_ID> 5234 </Advertiser_ID>
        <Advertiser_Weight> +4 </Advertiser_Weight>
    </Genre_ID>
    ...
</Genre_Mapping>
```

In one embodiment, the file pulled from the database may have genre pairings or mappings in a tree structure, for example where a node may be labeled "children's programming" but other genres like kids, children, family, and/or the like will fall under the children's programming genre in the tree hierarchy. In a similar way, "College Football" can be mapped in a hierarchy where "Football" is a node. Another example of mapping can include spelling mapping so when search terms are misspelled, users can nevertheless receive the results they intended to search for or results they would have received had they entered the correctly spelled search term. For example, a search word typed "asorbed" will be mapped to the correct spelling "absorbed" through a mapping file that contain alternate or common spellings of words. In still another example, abbreviations can be mapped to the complete name so a user can enter an abbreviation or nick name and still achieve results that would be achieved by spelling out the entire term. For example, a search for "Ed" should return results that contain the word "Edward." In still another example, search terms that would properly contain punctuation could be searched without the user having to enter the punctuation which is often difficult or impossible to include depending on the user friendliness of the search entry user interface. For example, some user interfaces may be difficult to use, may not provide certain characters or punctuation marks, or may take too much time if a user has to enter a complete word, title or the like. For example the proper title of the TV show "M*A*S*H" is printed with the asterisks, however this may be inconvenient for a user to enter or it may be unknown to a user. Upon typing the word "MASH" without the asterisks, the popular TV show should nevertheless appear in the results. The mapping files can be maintained in the attributes database and can be imported by the search module periodically. In one embodiment, there can be a file like a dictionary, for example, where nick names, or words without punctuation, or shortened versions of some words are mapped to the complete or more proper version of the words.

In such an embodiment the file can be accessed from the attribute database 223 and the search terms can be compared to the entries in the file so a determination can be made regarding which results should be selected for the entered search terms. Such a file can employ GREP, and/or the like notation and employ root expanders or wild cards characters within the search tokens so as to allow variations to the search terms, which allows for a more complete and accurate list of results to be obtained.

The attribute module 216 can apply one or more attributes to the search results. These attributes can include seasonality, geography, time, place or viewing habits of other users, and/or other like attributes. For example, the seasonality attribute can be used to return results based on sport season, holiday season, time of year, election cycles, and/or the like. In one embodiment, a time stamp can be identified and compared to a file that will indicate the relevant seasonality which can then be used by the weighting module 217 to classify the relevance of the search result to the entered request. For example, a search result that contains "Christmas" will get a plus one added to its weight during the holiday season. The sorting module 218 can then sort the results by weight and return the results to the user. In one embodiment the sorting can be done using a sort algorithm by reading the weights and reorganizing the results from greatest weight to least weight. In another example a geographical attribute can be used to return results based on the geographical location of the user.

In one embodiment, for example, a GPS can be used to determine the location of the user, while for home televisions and set-top boxes, for example, video hub offices (VHOs) can be used. The geography attribute can be used to return results based on the location of the user so that a search for certain sporting events, would return home teams' games and events, or other local viewing opportunities. For example, results containing "Patriots" for a search on the word will receive a plus one weight during football season in Boston. In this example, seasonality and geography can both operated on the results to aggregate and increase the weight assigned to certain results. In this example a result with the word "Patriots" might get one weight value for being a result in a search during football season and another for being in the result list of a search that was initiated in Boston. The relevant geography can be used in conjunction with information associated with a VHO which can then be used by the weighting module 217 to classify the relevance of the search result to the entered request. The sorting module 218 can then sort the results by weight and return the results to the user.

In another embodiment, the weighting module 217 can weight search results based on the results selected by other users that may be proximate in time or place or proximate and/or otherwise similar in viewing habits with the current user submitting a search request. For example, in one embodiment a popular show such as "American Idol", as may be ascertained in one implementation from Most Viewed Program statistics, may be assigned an increased weight compared to other assets and/or program content. A user submitting a search query with "American Idol" among less popularly viewed results may see the more popular program displayed more prominently among the returned results. In one implementation, the popularity of a program may be determined in relation to a subset of all viewers, such as may be defined by a particular set of characteristics, and the subsequent weighting of the result based on that popularity may be applied only for users within that subset. For example, a particular program may be especially popular among users who, according to their user profiles, are in a low-income group. This program may then be assigned an increased weight as a search result for members of this group.

In another embodiment, aspects of user viewing habits as well as search result selections may be stored in association with a user identifier, user profile, and/or the like. In one implementation, a user's most frequently viewed genres may be stored in association with the user as a characterization of the user's viewing habits. In another implementation, a viewing habit score may be generated, such as on a per-genre basis, for storage in association with the user. For example, a viewing habit score may begin at an initial value for each genre and may be incremented each time a user views a show associated with that genre. Viewer habit proximity may then be established by comparing viewing habit characteristics, favorite genres, viewing habit scores, etc between and/or across different user profiles. By way of example only, in an implementation in which a user has an associated viewing habit score assigned to each genre, the user may submit a search request. The user's profile may be queried to extract viewing habit scores and a user profiles database may be queried to discern other user profiles having viewing habit scores sufficiently close to those of the searching user (e.g., within a specified number of points). Those user profiles having sufficiently close viewing habit scores may be further queried to determine whether similar queries have been submitted and, if so, which search results were ultimately selected. These or similar results may then be preferentially presented to the searching user in response to the search request.

In general, the weighting module may query different tables in the IPG database, and retrieve weights to augment search results. In one embodiment, the search results from a search query, the results themselves are used to query the IPG database tables to match weight terms. For example, if search results have genre terms that match the XML genre terms already discussed, then the matched terms may include weights that are to be used to resort the search results. In one embodiment, the weights associated with the matched terms (e.g., a +3 weight associated with the "kids" genre term) are used as weights to affect sort rankings. In one embodiment the information regarding the location of users can be obtained from the user database 220 and compared to the user who has entered certain search criteria. Where users are close in proximity, for example, or viewing habits with the user who is performing the search, a weight of plus one can be added to a result that those other similar users have previously selected.

Users of wireless handsets and televisions select assets to watch, play, record and/or the like including videos, shows, games, videos on demand, and/or the like. In one implementation, this data may be logged into the VHOs and/or may be stored as one or more log files. The logged data in a log file may be extracted and sorted based on the number of selections that each asset receives, and the log file and/or extracted logged data, such as the most frequently selected assets and/or program content, may be incorporated in a boosting file and stored in the user database 220. The search module 215 can match queries with the indexed data in the boosting file. A list of results can be determined in response to a search request and/or query by matching keywords in different data fields associated with program content, such as titles, genres and descriptions for example to elements of the search query. In one implementation, a data field comprises a selection of an indexed document and/or asset which the search module can query against. For example, each document may include subsections such as Title, Description, Actor, Genre, and/or the like, and queries may be issued to seek matches with terms in one or more of these fields. Some or all of this list of results may be stored in the boosting file. The weighting module 217 can then weight each item depending on whether it is in the boosting file and which data field associated with program content is matched with the search criteria. For example, in one implementation, a title matching a search query may be weighted more heavily than a genre matching the search query, so a first program with a matching title may be preferentially provided to a searching user over a second program having only a matching genre. The search results generated by a query can be compared to the boosting file. If the search result is found in the boosting file it can be assigned a weight of plus one and it can be assigned additional weights depending on how many or in which data fields the item is found or how many other users selected that result, for example. The final result list can then be sorted by the sorting module 218 through a sorting algorithm that can re-order the results based on the weight values assigned to each and then the weighted and sorted results can be returned to the user. The boosting file may be updated regularly, such as on a weekly basis in one implementation.

The weighting module 217 can also interface to the product line of management (PLM) so that search result weighting can be managed for different search terms based on relevancy of different criteria. For example, keywords may be weighted differently depending on what field they are in. For example, a search request with the word "Batman" in it may produce results where the word "Batman" in the title may be weighted more heavily than if it were in a genre or description field.

In one implementation, the IPG controller 205 may further be coupled to one or more databases configured to store and/or maintain IPG data. A users database 220 may contain information or attributes pertaining to users, contact information, profile information, geography, viewing habits, previous search queries and accessed results, identities of hardware devices, CPEs, and/or the like associated with users, service preferences, system settings, and/or the like. A hardware database 221 may contain information or attributes pertaining to hardware devices with which the IPG may communicate, such as but not limited to types of mobile devices, serial number of set-top boxes, television model, CPEs, gateways, routers, and/or the like. In one embodiment, a robust operating system like Linux, for example, which contains drivers for communications with other devices may be employed allowing for communication using various transmission protocols, data formats, and/or the like suitable for communicating with hardware devices employed by any of a variety of IPG affiliated entities. An asset database 222 may contain information or attributes pertaining to shows, videos on demand, videos, games and/or the like including information regarding titles, studios, actors, directors, descriptions, genres, etc. An attribute database 223 may contain additional information or attributes that may be used for searching and weighting. These attributes can include seasonality, geography, numbers of users who have selected a certain asset, and other information that could constitute attributes of users or assets.

Figure 3C:
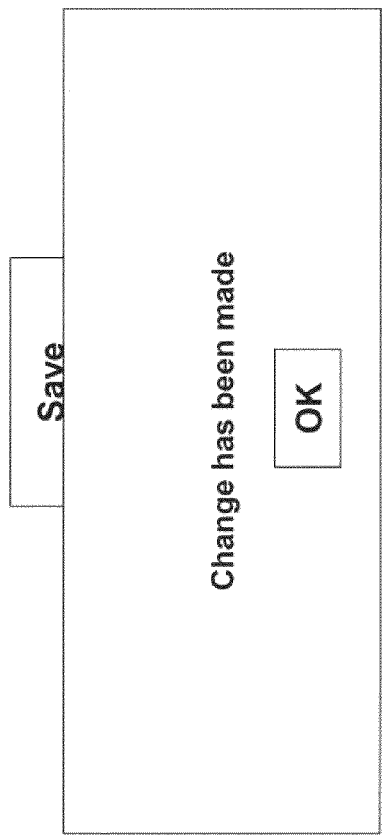
Figure 3C:

In another embodiment, a user will be able to work through a user interface to select the relevance criteria that is important to him or her. A user can essentially select a relevance hierarchy and have results sorted or limited by what is most relevant to that particular user. FIGS. 3A-3F show implementations of such an interface through screen shots. FIG. 3A is the home page 305 of the user interface "Relevance Tool" where a user can enter a search term or terms. FIG. 3B shows results returned by the IPG with predetermined relevance values 320 in a list of all results. Users can select an entry and change its relevance 315. A user will have the option to reset to the predetermined relevance value 325. An edit feature 330 will also provide the user with a means to change or delete changes made to the relevance values. FIG. 3C shows that a relevance value can be entered by the user and saved so that the results will be reordered according to the relevance values selected by the user as shown in FIG. 3D. The user can further drill down in the menus 335 to continue to hone the results for more personalized lists as shown in FIG. 3E. In FIG. 3F, a drill down item 335 may be selected before the search is performed so that a user will receive a more tailored list of results from the first search attempt rather than having to perform a series of searches, sorts and drill downs if they choose to do so.

Figure 4:
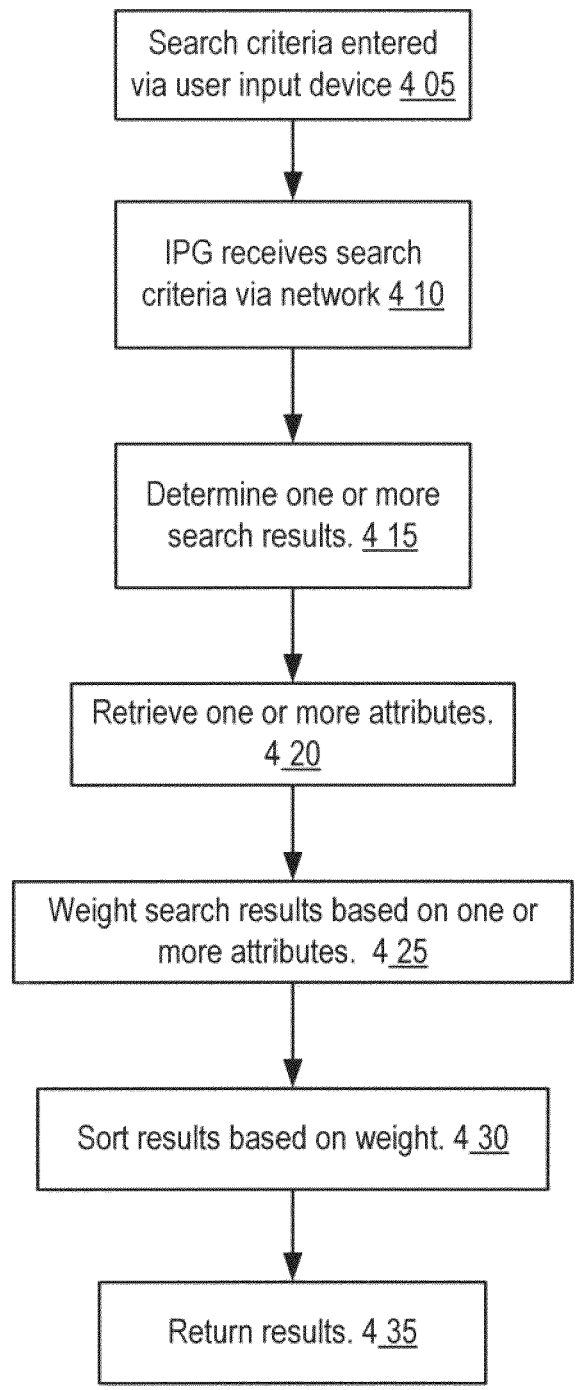
FIG. 4 shows aspects of an implementation of logic flow in one embodiment of IPG operation.

FIG. 4 shows an implementation of logic flow in an embodiment of IPG operation. A search request may be placed from a user 405 and received by the IPG 410. Search results may be determined by the IPG 415. Attributes may be retrieved and compared by the IPG 420 and applied to the search results in order to weight the results by relevance 425 according to the attribute. The weight can be determined in one embodiment by comparing the search results to any one of the attributes in an attribute database and where the attribute makes the result more relevant like Christmas in December then the result will be assigned a weight of one. In another embodiment, a user's profile may be read from the IPG database, and profile preferences may be used as a basis for varying weights: e.g., where a user specifies their location in their profile, search results matching the location specified in the profile, where the search results are a response to a search query of, for example, "restaurant," such matching search results would have an increased weight and tend to float upwards in the search results presented to the user. So for example, if the user specified their location as being in Texas, and search for the term "restaurant," then restaurant search results with the term "Texas" would tend to be weighted more even though the user never placed the term "Texas" in the actual search query. Where a result is relevant because it has a number of attributes correlating to seasonality, geography, user habits, or the like, additional weights can be assigned for an aggregated weight. The weighted results can then be sorted 430 so that the results can be returned 435 in order of relevance to the user.

IPG Controller

FIG. 5 of the present disclosure illustrates inventive aspects of an IPG controller 501 in a block diagram.

Typically, users, which may be people and/or other systems, engage information technology systems (e.g., commonly computers) to facilitate information processing. In turn, computers employ processors to process information; such processors are often referred to as central processing units (CPUs). A common form of processor is referred to as a microprocessor. CPUs use communicative signals to enable various operations. Such communicative signals may be stored and/or transmitted in batches as program and/or data components facilitate desired operations. These stored instruction code signals may engage the CPU circuit components to perform desired operations. A common type of program is a computer operating system, which, commonly, is executed by CPU on a computer; the operating system enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through a database program. Information technology systems provide interfaces that allow users to access and operate various system components.

In one embodiment, the IPG controller 501 may be connected to and/or communicate with entities such as, but not limited to: one or more users from user input devices 511; peripheral devices 512; a cryptographic processor device 528; and/or a communications network 513.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The IPG controller 501 may be based on common computer systems that may comprise, but are not limited to, components such as: a computer systemization 502 connected to memory 529.

Computer Systemization

A computer systemization 502 may comprise a clock 530, central processing unit (CPU) 503, a read only memory (ROM) 506, a random access memory (RAM) 505, and/or an interface bus 507, and most frequently, although not necessarily, the foregoing are all interconnected and/or communicating through a system bus 504. Optionally, the computer systemization may be connected to an internal power source 586. Optionally, a cryptographic processor 526 and/or a global positioning system (GPS) component 575 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU may be a microprocessor such as AMD's Athlon, Duron and/or Opteron; IBM and/or MOTOROLA's PowerPC; IBM's and SONY's Cell processor; INTEL'S CELERON, ITANIUM, PENTIUM, XEON, and/or XScale; and/or the like processor(s). The CPU interacts with memory through signal passing through conductive conduits to execute stored signal program code according to conventional data processing techniques. Such signal passing facilitates communication within the IPG controller and beyond through various interfaces. Should processing requirements dictate a greater amount of speed, parallel, mainframe and/or super-computer architectures may similarly be employed. Alternatively, should deployment requirements dictate greater portability, smaller Personal Digital Assistants (PDAs) may be employed.

Power Source

The power source 586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 586 is connected to at least one of the interconnected subsequent components of the IPG thereby providing an electric current to all subsequent components. In one example, the power source 586 is connected to the system bus component 504. In an alternative embodiment, an outside power source 586 is provided through a connection across the I/O 508 interface. For example, a USB and/or IEEE 1394 connection carries both data and power across the connection and is therefore a suitable source of power.

Interface Adapters

Interface bus(es) 507 may accept, connect, and/or communicate to a number of interface adapters, conventionally although not necessarily in the form of adapter cards, such as, but not limited to: input output interfaces (I/O) 508, storage interfaces 509, network interfaces 510, and/or the like. Optionally, cryptographic processor interfaces 527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 509 may accept, communicate, and/or connect to a number of storage devices such as, but not limited to: storage devices 514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 510 may accept, communicate, and/or connect to a communications network 513. Through a communications network 513, the IPG controller is accessible through remote clients 533b (e.g., computers with web browsers) by users 533a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 510 may be used to engage with various communications network types 513. For example, multiple network interfaces may be employed to allow for the communication over broadcast, multicast, and/or unicast networks.

Input Output interfaces (I/O) 508 may accept, communicate, and/or connect to user input devices 511, peripheral devices 512, cryptographic processor devices 528, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 511 may be card readers, dongles, finger print readers, gloves, graphics tablets, joysticks, keyboards, mouse (mice), remote controls, retina readers, trackballs, trackpads, and/or the like.

Peripheral devices 512 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the IPG controller may be embodied as an embedded, dedicated, and/or monitor-less (i.e., headless) device, wherein access would be provided over a network interface connection.

Cryptographic units such as, but not limited to, microcontrollers, processors 526, interfaces 527, and/or devices 528 may be attached, and/or communicate with the IPG controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allow for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 529. However, memory is a fungible technology and resource; thus, any number of memory embodiments may be employed in lieu of or in concert with one another. It is to be understood that the IPG controller and/or a computer systemization may employ various forms of memory 529. For example, a computer systemization may be configured wherein the functionality of on-chip CPU memory (e.g., registers), RAM, ROM, and any other storage devices are provided by a paper punch tape or paper punch card mechanism; of course, such an embodiment would result in an extremely slow rate of operation. In a typical configuration, memory 529 will include ROM 506, RAM 505, and a storage device 514. A storage device 514 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); an array of devices (e.g., Redundant Array of Independent Disks (RAID)); and/or other devices of the like. Thus, a computer systemization generally requires and makes use of memory.

Component Collection

The memory 529 may contain a collection of program and/or database components and/or data such as, but not limited to: operating system component(s) 515 (operating system); information server component(s) 516 (information server); user interface component(s) 517 (user interface); Web browser component(s) 518 (Web browser); database(s) 519; mail server component(s) 521; mail client component(s) 522; cryptographic server component(s) 520 (cryptographic server); the IPG component(s) 535; and/or the like (i.e., collectively a component collection). These components may be stored and accessed from the storage devices and/or from storage devices accessible through an interface bus. Although non-conventional program components such as those in the component collection, typically, are stored in a local storage device 514, they may also be loaded and/or stored in memory such as: peripheral devices, RAM, remote storage facilities through a communications network, ROM, various forms of memory, and/or the like.

Operating System

The operating system component 515 is an executable program component facilitating the operation of the IPG controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the IPG controller to communicate with other entities through a communications network 513. Various communication protocols may be used by the IPG controller as a subcarrier transport mechanism for interaction, such as, but not limited to: multicast, TCP/IP, UDP, unicast, and/or the like.

Information Server

An information server component 516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, Java, JavaScript, Practical Extraction Report Language (PERL), Hypertext Pre-Processor (PHP), pipes, Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the IPG controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the IPG database 519, operating systems, other program components, user interfaces, Web browsers, and/or the like.

Access to the IPG database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the IPG. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the IPG as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/Vista (i.e., Aero)/XP, or Unix's X-Windows (e.g., which may include additional Unix graphic interface libraries and layers such as K Desktop Environment (KDE), mythTV and GNU Network Object Model Environment (GNOME)), provide a baseline and means of accessing and displaying information graphically to users.

A user interface component 517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact with, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 518 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program components through facilities such as Java, JavaScript, ActiveX, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the IPG enabled nodes. The combined application may be nugatory on systems employing standard Web browsers.

Mail Server

A mail server component 521 is a stored program component that is executed by a CPU 503. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the IPG.

Access to the IPG mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 522 is a stored program component that is executed by a CPU 503. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 520 is a stored program component that is executed by a CPU 503, cryptographic processor 526, cryptographic processor interface 527, cryptographic processor device 528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the IPG may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the IPG component to engage in secure transactions if so desired. The cryptographic component facilitates the secure accessing of resources on the IPG and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The IPG Database

The IPG database component 519 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the IPG database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data, but may have other types of functionality encapsulated within a given object. If the IPG database is implemented as a data-structure, the use of the IPG database 519 may be integrated into another component such as the IPG component 535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 519 includes several tables 519*a-c*. A Users table 519*a* may include fields such as, but not limited to: user_ID, user_name, contact_info, hardware_ID, mobile_device_type, usage_history, and/or the like. A Hardware table 519*b* may include fields such as, but not limited to: hardware_ID, hardware_type, hardware_name, data_formatting_requirements, protocols, addressing_info, usage_history, hardware_requirements, user_ID, and/or the like. An IPG table 519*c* may include fields such as, but not limited to: asset-ID, attribute_ID, user_ID, weight_ID, mapping_data, log_file_ID, time, date, source, destination, and/or the like. These tables may support and/or track multiple entity accounts on the IPG controller.

In one embodiment, the IPG database may interact with other database systems. For example, employing a distributed database system, queries and data access by search IPG component may treat the combination of the IPG database, an integrated data security layer database as a single database entity.

In one embodiment, user programs may contain various user interface primitives, which may serve to update the IPG. Also, various accounts may require custom database tables depending upon the environments and the types of clients the IPG may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 519*a-c*. The IPG may be configured to keep track of various settings, inputs, and parameters via database controllers.

The IPG database may communicate to and/or with other components in a component collection, including itself, and/or facilities of the like. Most frequently, the IPG database communicates with the IPG component, other program components, and/or the like. The database may contain, retain, and provide information regarding other nodes and data.

The IPG Component

The IPG component 535 is a stored program component that is executed by a CPU. In one embodiment, the IPG component incorporates any and/or all combinations of the aspects of the IPG that was discussed in the previous figures. As such, the IPG affects accessing, obtaining and the provision of information, services, transactions, and/or the like across various communications networks.

The IPG component is configurable to access, calculate, engage, exchange, generate, identify, instruct, match, process, search, serve, store, and/or facilitate communication channels between IPG components and/or affiliated entities, transmission of search criteria, results, and/or the like and use of the IPG.

The IPG component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, WebObjects, and/or the like. In one embodiment, the IPG server employs a cryptographic server to encrypt and decrypt communications. The IPG component may communicate to and/or with other components in a component collection, including itself, and/or facilities of the like. Most frequently, the IPG component communicates with the IPG database, operating systems, other program components, and/or the like. The IPG may contain, communicate, generate, obtain, and/or provide program component, system, user, and/or data communications, requests, and/or responses.

Distributed IPGs

The structure and/or operation of any of the IPG node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the IPG controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A method, comprising:
   receiving, at an interactive program guide, search criteria from a client device;
   receiving, at the interactive program guide and from the client device, a user identifier and a selection from predetermined genres, wherein the predetermined genres are mapped to a set of television programming;
   determining, with the interactive program guide, one or more search results in response to the search criteria, the user identifier and the selection from the predetermined genres;
   querying one or more databases of attributes with portions of the search results, wherein the attributes include genre terms;
   comparing each of the search results to the attributes to determine matches between selection from the predetermined genres, the portions of the search results and the genre terms;
   customizing search result attribute correlations and correlation weights for each of the search results based on the user identifier, matches between 1) the portions of the search results, 2) the genre terms and 3) the selection from predetermined genres;
   calculating result weights for each of the search results by summing the correlation weights associated with each search result;
   sorting the search results so the search results are returned in order of relevance according to the result weights; and
   returning the search results.

2. The method of claim 1, wherein calculating the result weights further comprises:
   identifying a time stamp;
   comparing the time stamp to a seasonal attribute; and
   calculating the result weights further based on the comparison.

3. The method of claim 1, wherein calculating the result weights further comprises:
   determining a location of the client device;
   calculating the result weights further based on the location.

4. The method of claim 1, wherein calculating the result weights further comprises:
   calculating the result weights further based on at least one of seasonal attributes and location.

5. The method of claim 1, further comprising:
   updating the correlation weights on a periodic basis.

6. The method of claim 1, wherein calculating the result weights further comprises:
   calculating the result weights further based on a log file of frequently selected programs.

7. The method of claim 6, wherein the log file contains search results selected by users proximate in time.

8. The method of claim 6, wherein the log file contains search results selected by users proximate in place.

9. The method of claim 6, wherein the log file contains search results selected by users proximate in viewing habits.

10. The method of claim 6, wherein calculating the results weights further comprises:
    using a subset of the log file based on the customization instruction which is received from the client device and associated with the user identifier.

11. The method of claim 6, further comprising:
    determining the most frequently selected programs from the log file;
    creating a boosting file including the most frequently selected programs;
    querying the boosting file with at least a portion of the search results; and
    weighting the search results if it is present in the boosting file.

12. The method of claim 11, wherein the log file includes a genre data field, a title genre field or a description data field and further comprising:
    determining which of the data fields matches the query; and
    weighting the search results based on which data field in the boosting file is matched.

13. The method of claim 1, wherein calculating the result weights further comprises:
    calculating the result weights further based on the field where the search criteria is found.

14. The method of claim 1, wherein determining the correlation weights comprises:
    analyzing the search result attribute correlations according to relevancy of content attributes with the portions of the search results.

15. The method of claim 1, wherein the spatial temporal content attributes are independent of historical user behavior.

16. The method of claim 1, further comprising:
    receiving the customization instruction via the client device to customize the correlation weights;
    updating the result weights for each of the search results based on the customization instruction; and
    sorting the search results such that the search results are arranged in order of relevance according to updated result weights.

17. The method of claim 1, wherein the search result attribute correlations and the correlation weights are dynamically variable.

18. The method of claim 1, further comprising:
    creating a viewing habit score for the user identifier for the predetermined genres;
    increasing the viewing habit score for a respective one of the predetermined genres each time the user views a program associated with the respective one of the predetermined genres; and
    storing the viewing habit score in association with the user identifier.

19. The method of claim 18, further comprising:
querying the user profile associated with the user identifier in response to the search request to retrieve the associated viewing habit score;
querying a user profile database to locate other user profiles with viewing habit scores in proximity to the retrieved viewing habit score;
determining selected search results from the other user profiles; and
preferentially presenting the selected search results to the searching user.

20. The method of claim 1, further comprising:
arranging the predetermined genres in a tree structure including nodes arranged in a hierarchy.

21. One or more tangible non-transitory computer-readable storage media for storing computer-executable instructions executable by a computer system, the media storing one or more instructions to:
receive, at an interactive program guide, search criteria from a client device;
receive, at the interactive program guide and from the client device, a user identifier and a selection from predetermined genres, wherein the predetermined genres are mapped to a set of television programming;
determine, with the interactive program guide, one or more search results in response to the search criteria, the user identifier and the selection from the predetermined genres;
query one or more databases of attributes with portions of the search results, wherein the attributes include genre terms;
compare each of the search results to the attributes to determine matches between selection from the predetermined genres, the portions of the search results and the genre terms;
customize search result attribute correlations and correlation weights for each of the search results based on the user identifier, matches between 1) the portions of the search results, 2) the genre terms and 3) the selection from predetermined genres;
calculate result weights for each of the search results by summing the correlation weights associated with each search result;
sort the search results so the search results are returned in order of relevance according to the result weights; and
return the search results.

22. The computer-readable storage media of claim 21, wherein the instructions to calculate the result weights further comprise instructions to:
identifying a time stamp;
comparing the time stamp to a seasonal attribute; and
calculate the result weights further based on the comparison.

23. The computer-readable storage media of claim 21, wherein the instructions to calculate the result weights further comprise instructions to:
determining a location of the client device;
calculate the result weights further based on the location.

24. The computer-readable storage media of claim 21, wherein the instructions to calculate result weights further comprise instructions to:
calculate the result weights further based on at least one of seasonal attribute and location.

25. The computer-readable storage media of claim 21, further comprising instructions to:
update the correlation weights on a periodic basis.

26. The computer-readable storage media of claim 21, wherein the instructions to calculate result weights further comprise instructions to:
calculate the result weights further based on a log file of frequently selected programs.

27. The computer-readable storage media of claim 26, wherein the log file contains search results selected by users proximate in time.

28. The computer-readable storage media of claim 26, wherein the log file contains search results selected by users proximate in place.

29. The computer-readable storage media of claim 26, wherein the log file contains search results selected by users proximate in viewing habits.

30. A communications apparatus, comprising:
a processor;
a memory, communicatively connected to the processor;
a program, stored in the memory, including,
a module to receive, at an interactive program guide, search criteria from a client device;
a module to receive, at the interactive program guide and from the client device, a user identifier and a selection from predetermined genres, wherein the predetermined genres are mapped to a set of television programming;
a module to determine, with the interactive program guide, one or more search results in response to the search criteria, the user identifier and the selection from the predetermined genres;
a module to query one or more databases of attributes with portions of the search results, wherein the attributes include genre terms;
a module to compare each of the search results to the attributes to determine matches between selection from the predetermined genres, the portions of the search results and the genre terms;
a module to customize search result attribute correlations and correlation weights for each of the search results based on the user identifier, matches between 1) the portions of the search results, 2) the genre terms and 3) the selection from predetermined genres;
a module to calculate result weights for each of the search results by summing the correlation weights associated with each search result;
a module to sort the search results so the search results are returned in order of relevance according to the result weights; and
a module to return the search results.

31. The method of claim 1, wherein determining the search results comprises:
determining a client device location and a time of search criteria receipt derived from the search criteria.

32. The method of claim 31, wherein comparing each of the search results to the content attributes further comprises:
comparing the content attributes to the search results, the client device location, and the time of search criteria receipt.

* * * * *